Feb. 14, 1961 W. R. WOODALL 2,971,553
TIRE CONSTRUCTION
Filed March 4, 1957 2 Sheets-Sheet 1
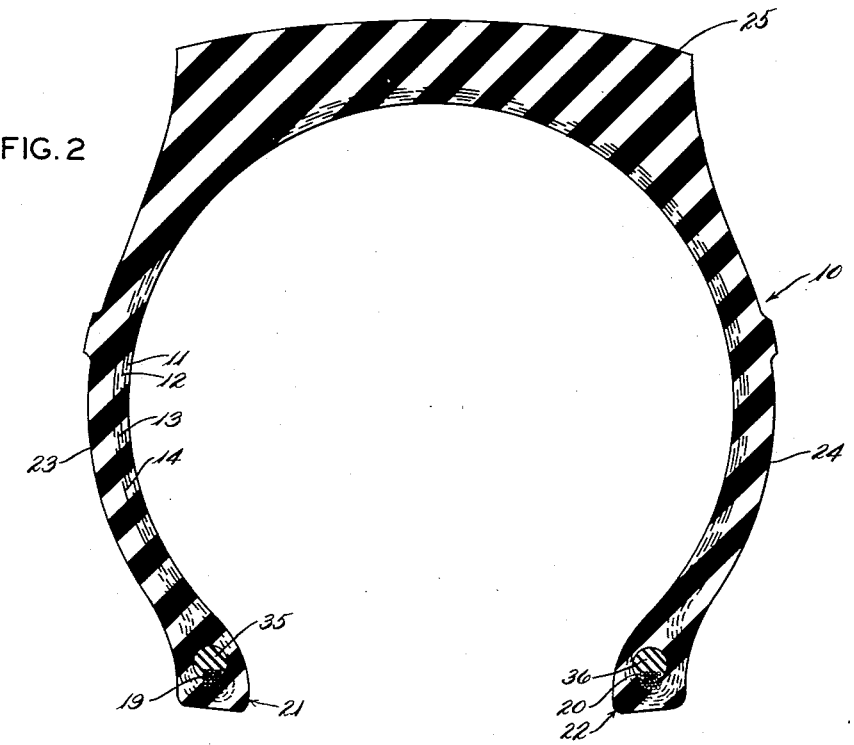
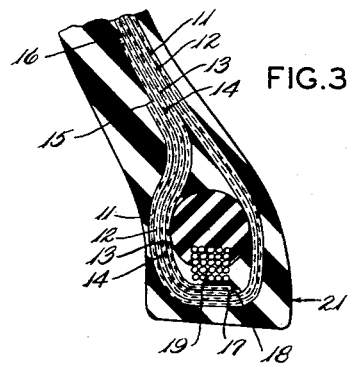
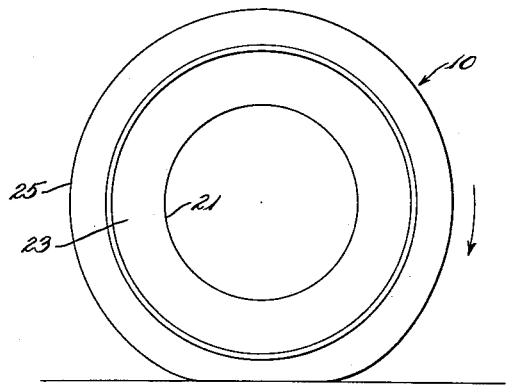
INVENTOR.
WILLIAM R. WOODALL
BY
W. A. Fraser
ATTY.

United States Patent Office 2,971,553
Patented Feb. 14, 1961

2,971,553
TIRE CONSTRUCTION

William R. Woodall, Akron, Ohio, assignor to The Firestone Tire & Rubber Company, Akron, Ohio, a corporation of Ohio Filed Mar. 4, 1957, Ser. No. 643,630

2 Claims. (Cl. 152—362)

This invention relates to pneumatic tires and particularly to pneumatic tire constructions providing improved ride characteristics.

In recent years, as automobiles have become quieter in operation and as the road surfaces have become smoother, many pneumatic tires have been observed to have an objectionable ride characteristic referred to as "thump." A thumping tire transmits a periodic impulse to an automobile which at certain speeds will strike a resonance in a panel or other member of the automobile and will thereby be amplified to the point where it is annoying and objectionable.

At one time it was thought that thump was due to an out-of-balance condition of a tire, but perfectly balanced tires have been found to thump. It has been thought too that the presence of irregularities in the tire construction such as heavy body ply or tread splices, or out-of-round conditions would cause thump; yet, tires, which upon inspection are of sound construction, still exhibit this defect.

The present invention has turned away from all such conventional theories of thump and has found that if the cords of an otherwise sound tire are uniformly tensioned, thump does not occur. Hence, before discussing the solution to this problem as it is embodied in the present invention, it may be well to consider the problem of cord tension and the manner in which variations in cord tension produce thump.

As a tire rolls along a pavement, the cords of the body plies of the tire pass successively through the so-called "footprint" of the tire, the footprint being the area of contact which the tire makes with the road. The cords, just before entering the footprint, are under longitudinal tension as induced by the inflationary air pressure within the tire. As the cords enter the footprint, they lose their tension, and they remain free from tension so long as they remain in the footprint. Immediately after the cords leave the footprint they assume the same tension they had before. This resumption of a condition of tension occurs with a "snap" and when the cords snap into tension they impart rapidly successive shocks to the bead of the tire which are transmitted from the tire to the vehicle itself. Such shocks are imparted uniformly to the wheel if the cords are under uniform tension. However, if the cord tensions in a portion of a body ply or plies is substantially different from the tension in the remainder of the cords, there will be a series of distinctly different shocks imparted to the wheel periodically as such portion enters and leaves the footprint.

Consider, for example, the effect of a portion of a body ply extending over about 10° of arc and having a tension 20% greater than the remainder of the body plies. As such a portion leaves the footprint, the cords will snap outwardly into distended position with greater force than the cords extending over the remaining 350° of arc, and the shocks imparted to the vehicle wheel by this portion will be of consequently greater force. Thus each time such a portion passes through the footprint, a disturbance will be transmitted to the vehicle, a disturbance which manifests itself as "thump."

The present invention solves this problem of the variation in cord tension around the periphery of the tire and the attendant problem of thump, by introducing elements into the tire which act as cord-tension regulators and which permit the cords having excess tension to relieve themselves of a major portion of such extra tension. Preferably such tension-regulating elements comprise relatively soft, yieldable members which support the cords in such a manner that the highly stressed cords "bite" deeply into the members and in this fashion relieve themselves of some of the loads and tensions which they would otherwise bear while the cords which are less highly stressed bite into the members to a lesser degree and their tension is relieved to a much less extent. Such yieldable supporting members thus permit an automatic adjustment of the cord tensions in accordance with the degree of such tensions and as a result of such adjustment, the cord tensions become fairly uniform.

In the preferred form of the invention, the tension-regulating elements comprise a ring of soft rubber built into each tire bead, the rings being positioned adjacent to and radially outside the inextensible wires making up the cores of the tire beads. These rings of soft rubber are sufficiently thick to project laterally beyond the sides of the bead cores so that the cords of the body plies have bearing contact against the sides of the rings. The cords, because they are under tension, tend to pull laterally inwardly upon the soft rings. Those cords which are under the higher tensions will pull inwardly upon the rings to a greater extent than the cords having lesser tensions. The highly tensioned cords thus tend to be relieved of their excess tensions. The location of such soft rubber rings outwardly of the bead cores is particularly advantageous because it enables the cord tension to be regulated without detracting from the rigidity and solidity of the tire beads.

It is accordingly a general object of the invention to provide a pneumatic tire having improved ride characteristics.

A further object is to provide a pneumatic tire which is free from the objectionable ride characteristic which is termed "thump" by present-day tire engineers.

A more specific object is to provide a pneumatic tire construction in which the body plies have a limited freedom to pull inwardly and shorten their length under tension.

A further object is to provide means whereby the shocks caused by the changes in tension in the cords of the body plies of the tire as such cords pass through the footprint of the tire are effectively cushioned before they are transmitted to the vehicle.

Another object is to provide means which will eliminate thump in a tire without adding to the difficulty or expense of manufacture and without detracting from the performance of the tire in other respects.

These and further objects and advantages will be apparent from the following description of several forms of the invention, reference being had to the accompanying drawings in which:

Figure 1 is a side elevation of a tire embodying the present invention shown inflated and in contact with the road;

Figure 2 is a sectional view taken in a radial plane of the tire of Figure 1 on an enlarged scale;

Figure 3 is an enlarged fragmentary sectional view of the left bead of Figure 1;

Figure 4:
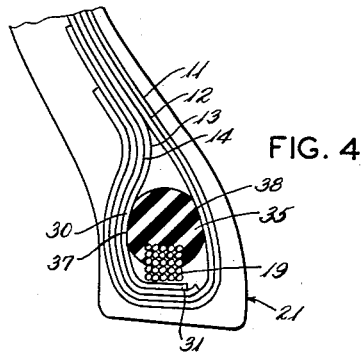
Figure 4 is a view similar to Figure 3, but is somewhat diagrammatic in character to show the manner in which the tire cords "bite" into the cushion member.

The invention is described, by way of example, in connection with an otherwise conventional pneumatic passenger tire indicated generally at 10 in the drawings. Such a tire, as shown in Figure 1, usually comprises a body of four plies 11, 12, 13 and 14 of rubberized, essentially weftless fabric. The edges 15—18 of the plies, respectively, are turned about and anchored to the wire bundles 19 and 20 which form the inextensible portions of the tire beads 21 and 22. The tire is completed by the sidewalls 23 and 24 and by the tread 25.

In order to lend stability to the tire, the warp cords of the body plies extend at an angle of about 54° to the axis of the tire and the cords of each ply extend at opposite angles to the cords of adjacent plies. Although in the present example, four body plies are shown, it is to be understood that the invention can be used with equal advantage in tires having any suitable number of plies. Also, in the present example, the individual twisted cords making up the body plies are of rayon and have a 1650/2 construction, but the invention can be applied equally well in tires having cords of other material such as cotton or the other synthetic fibers such as nylon, dacron and the like. The invention is likewise as useful with monofilaments as with twisted cords and also with metal wires and cables.

The position and function of an individual cord in one of the body plies of the tire is best shown in Figure 4 which is a somewhat diagrammatic section of the left bead of the tire.

The cord, which is indicated at 30, is part of the second ply 12 and extends from bead to bead of the tire with its free end 31 wrapped about the wire bundle 19.

When the tire is inflated, it expands until the force of the inflationary air is balanced by the tension in the cords of the body plies, since the rubber portions of the tire do not serve to resist the inflationary pressures to an appreciable extent. Cord 30 is therefore under a tension of about 2–3 pounds and as a result it strives to shorten its length and relieve itself of such tension.

In a conventional tire construction it is not possible for cord 30 to shorten its length appreciably because it is buttressed in the tire by the supporting rubber and in the bead areas by the fabric reinforces which normally enclose the wire bundles of the beads. Cord 30 in the usual tire construction is thus placed in an unyielding environment so that it cannot change its length and its tension is maintained so long as the tire is inflated.

According to the present invention, however, provision is made to enable the cord 30 to shorten its length by an amount approximately proportional to the tension originally imposed upon it. This is done by providing rings 35 and 36 of relatively soft rubber which are positioned adjacent to and just outwardly of the bead wires 19 and 20. It will be noted that the usual fabric reinforce which ordinarily encloses the wires of a bead is omitted from each bead and the rubber rings are in direct contact with the wire bundles. The hardness of the rings is preferably in the range of about 40 durometer. The hardness, however, is not so important as the resiliency of the material, the required resiliency being obtained with stocks which vary somewhat in hardness. This hardness of approximately 40 durometer is still substantially softer than the tread and sidewall stock which in a conventional tire have hardnesses in the ranges of 57–60 and 50–60, respectively. Preferably the rings are partly or fully cured before they are built into the tire so that they can withstand the molding pressures without flattening out too much.

In the present example, the rings in the vulcanized tire are about 7/16 inch thick and they project laterally beyond the wire bundles on each side as indicated at 37 and 38 by about 1/16 inch. As a result, when the cord 30 is wrapped about the bead wires, it has bearing contact with the projecting side 37 of the rings. When the tire is inflated and cord 30 is placed under tension, it will tend to pull laterally inwardly upon the rings and to embed itself in the sides 37 of the rings, see Figure 4.

What is true of cord 30 is likewise true of all the other cords of the body ply and of the other plies as well. Each cord will pull inwardly against the resilient rings. The cords which are under the greatest tensions will pull inwardly more deeply into the resilient rings than the cords having lesser tension. The result is that the cords tending originally to be under more tension will shorten their effective lengths and a relatively short time after the tire is first inflated, the rubber rings will have enabled the cords to equalize their tensions.

The cords which comprise the plies 11 and 14 will not embed themselves directly in the rubber rings but they will nevertheless shorten their lengths because the underlying plies 12 and 13 will yield under their pressure and move inwardly upon the rubber rings.

As a result of such tension-equalizing rings, the cords of the tire will impart shocks of equal amplitude to the vehicle as they pass through the footprint and such tires are remarkably free from that objectionable ride characteristic known as "thump."

Figure 5:
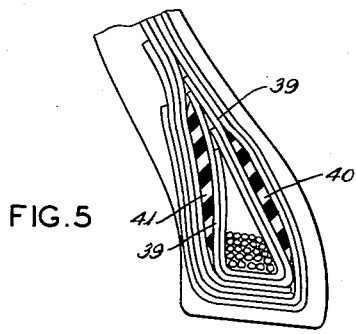
Figure 5 is a view similar to Figure 4 showing another modification of the invention.

In an alternative form of invention, the tire beads have the usual bundle of wires which in this case are each covered by a square-woven fabric reinforce 39, see Figure 5 in which the left bead is shown. Normally the body plies would be supported by and would be unable to pull inwardly upon the relatively unyielding reinforce. According to the present invention, however, a pair of pads 40 and 41 of soft rubber having a thickness of about one-tenth inch are positioned on each side of the fabric reinforces. Such pads may be adhered to the fabric reinforce at the time that the bead grommet is assembled or they may be applied separately to the beads as the tire is built. In either case, these pads of soft rubber perform the same function as the rubber rings 35 and 36 in the embodiment of Figures 1–4; they provide a means for cords under tension to move laterally into the beads and thereby shorten their lengths. The pads 40 are also of about the same hardness and resiliency as the rubber rings 35 and 36 and they also are partially or fully cured before they are built into the tire.

Figure 6:
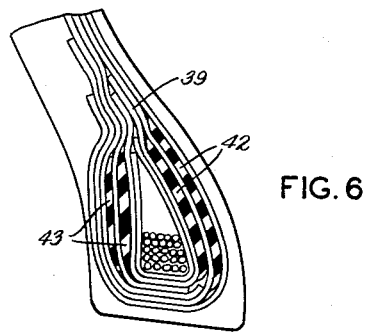
Figure 6 is a view similar to Figure 4 showing yet another modification of the invention.

In yet another form of the invention, the rubber pads 40 and 41 are positioned on each side of the fabric reinforce, as in the manner shown in Figure 5, and in addition, similar pads 42 and 43 are interposed between each of the body plies, as shown in Figure 6, so that each body ply seats directly against and has an opportunity to imbed itself in a resilient pad. This construction gives all the plies the same opportunity to regulate their tensions. The pads 42 and 43 have the same resiliency as pads 40 and 41 and they likewise are preferably cured or semi-cured before they are built in the tire. The annular edges of all the pads should be tapered as shown to eliminate abrupt changes in section.

Experiments have shown that tires having these features of construction are remarkably free from thump and are quieter in operation than tires of conventional construction. The tension-regulating elements do not introduce any appreciable difficulty in tire manufacture or in the performance of the tire in other respects and they are remarkably effective in producing the desired results.

I claim:

1. A pneumatic tire having a body comprising at least one ply extending from one bead to the other bead of said tire, the strain-resisting elements of said ply having margins wrapped about and anchored to circumferential, substantially inextensible members comprising the cores of said tire beads, respectively, and cushioning means positioned in each of said tire beads and extending in a direction axially outwardly beyond and adjacent said cores, said cushioning means being in supporting contact with said strain-resisting elements and comprising a rubbery stock having a hardness substantially less than the sidewall and tread stocks of said tire, whereby said strain-resisting elements pull laterally into said cushioning means and shorten their said effective lengths when said tire is inflated and said elements are placed in tension.

2. The tire of claim 1, in which said cushioning means comprises annular pads.

References Cited in the file of this patent

UNITED STATES PATENTS

| | | |
|---|---|---|
| 1,482,240 | Marquette | Jan. 29, 1924 |
| 1,809,106 | Carlin | June 9, 1931 |
| 1,813,176 | Lequillon | July 7, 1931 |
| 2,752,980 | Riggs | July 3, 1956 |
| 2,874,747 | Woodall | Feb. 24, 1959 |